(12) United States Patent
Yasoshina et al.

(10) Patent No.: US 9,334,782 B2
(45) Date of Patent: May 10, 2016

(54) EXHAUST GAS PURIFICATION DEVICE FOR GENERAL-PURPOSE ENGINE

(71) Applicant: HONDA MOTOR CO., LTD., Tokyo (JP)

(72) Inventors: Sayaka Yasoshina, Wako (JP); Ryo Saito, Wako (JP); Kenichi Etsunagi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/200,355

(22) Filed: Mar. 7, 2014

(65) Prior Publication Data

US 2014/0250871 A1    Sep. 11, 2014

(30) Foreign Application Priority Data

Mar. 11, 2013    (JP) .................................. 2013-047811

(51) Int. Cl.
*F01N 3/10*    (2006.01)
*F01N 3/30*    (2006.01)

(52) U.S. Cl.
CPC ............ *F01N 3/303* (2013.01); *F01N 2230/04* (2013.01); *F01N 2270/10* (2013.01)

(58) Field of Classification Search
CPC .. F01N 3/303; F01N 2230/04; F01N 2270/10
USPC .................................................. 60/304, 317
See application file for complete search history.

(56) References Cited

U.S. PATENT DOCUMENTS

| 4,319,452 | A | * | 3/1982 | Morita et al. .................... 60/293 |
| 2004/0216453 | A1 | * | 11/2004 | Oshima et al. .................. 60/322 |
| 2009/0266327 | A1 | * | 10/2009 | Morita et al. ............. 123/184.47 |
| 2009/0282819 | A1 | * | 11/2009 | Kashima .......................... 60/317 |

(Continued)

FOREIGN PATENT DOCUMENTS

| CN | 1963163 A | | 5/2007 |
| JP | 05113119 A | * | 5/1993 |

(Continued)

OTHER PUBLICATIONS

Office Action dated Nov. 30, 2015, issued in counterpart Chinese Patent Application No. 201410083282.6. (6 pages).

*Primary Examiner* — Jesse Bogue
*Assistant Examiner* — Matthew T Largi
(74) *Attorney, Agent, or Firm* — Westerman, Hattori, Daniels & Adrian, LLP

(57) ABSTRACT

An exhaust gas purification device for a general-purpose engine includes a crankcase and a cylinder block provided continuously on an upper portion of the crankcase and inclined to one lateral side of the crankcase. A catalytic converter is provided in an exhaust muffler of the engine. A downstream end of a secondary air introduction pipe is connected to an exhaust pipe upstream of the muffler. A dedicated air filter is connected through a one-way valve to an upstream side of the secondary air introduction pipe. The filter is disposed between the crankcase and a lower surface of the cylinder block. The secondary air introduction pipe is arranged so as to meander on one side of the cylinder block. Accordingly, the device can be employed without increasing an outer size of the engine, and can also securely introduce secondary air into an exhaust system, thereby enhancing an exhaust gas purifying effect.

6 Claims, 2 Drawing Sheets

(56) References Cited

U.S. PATENT DOCUMENTS

2012/0167558 A1* 7/2012 Svihla et al. .................. 60/323
2012/0222414 A1* 9/2012 Shimizu et al. ............... 60/311

FOREIGN PATENT DOCUMENTS

| JP | 06-002537 A | 1/1994 | |
|----|-------------|--------|------|
| JP | 06002537 A * | 1/1994 | ............... F01N 3/34 |

* cited by examiner

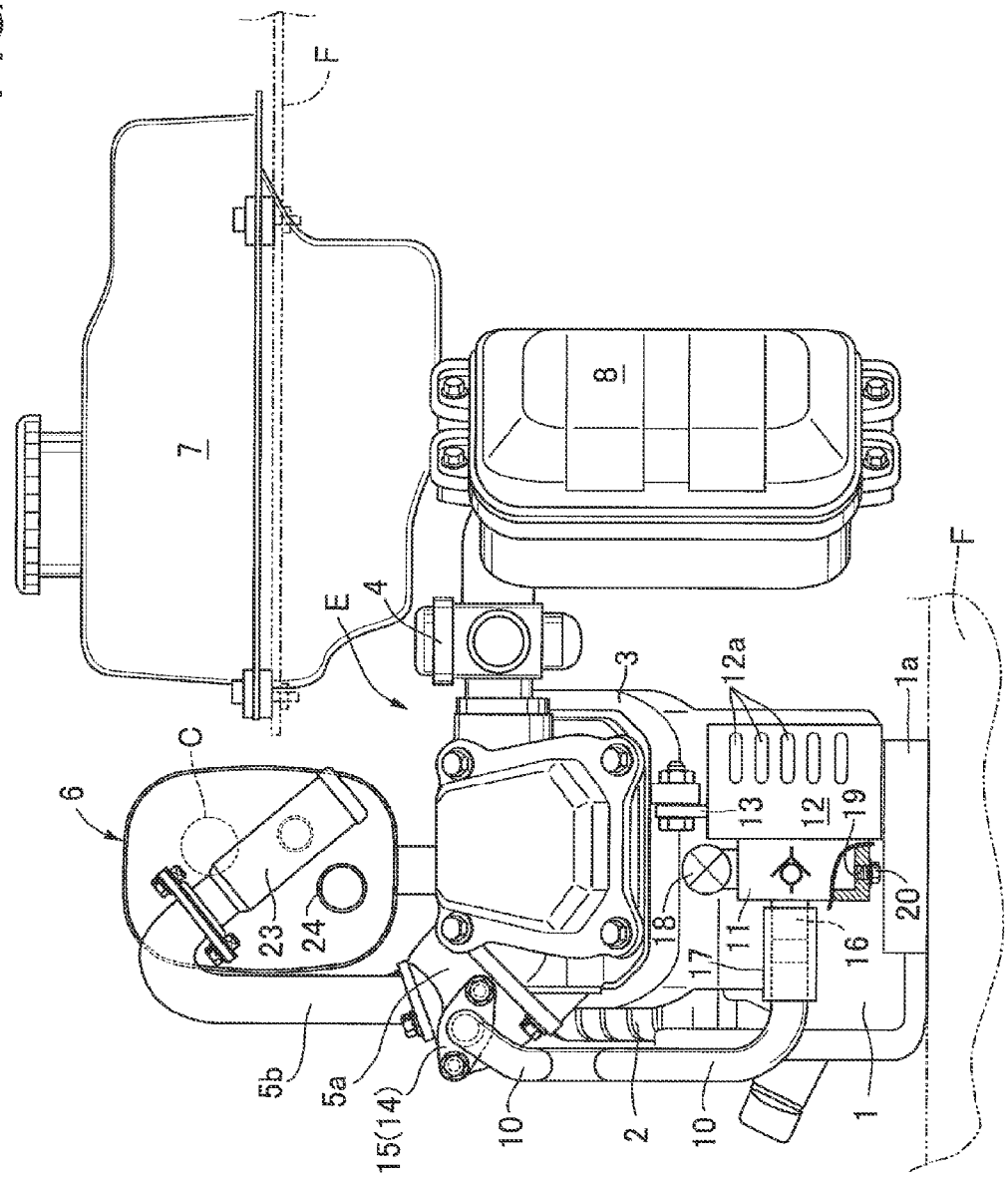

EXHAUST GAS PURIFICATION DEVICE FOR GENERAL-PURPOSE ENGINE

BACKGROUND OF THE INVENTION

1. Field of the Invention

The present invention relates to an exhaust gas purification device for a general-purpose engine comprising a crankcase and a cylinder block provided continuously on an upper portion of the crankcase and inclined to one lateral side of the crankcase, in which a catalytic converter is provided in an exhaust muffler of a general-purpose engine, a downstream end of a secondary air introduction pipe is connected to an exhaust pipe upstream of the exhaust muffler, a dedicated air filter independent from an intake air cleaner of the engine is connected through a one-way valve to an upstream side of the secondary air introduction pipe, and the one-way valve is configured to be opened upon receipt of negative pressure in exhaust pulsation of the engine, thereby supplying secondary air filtered by the air filter to the exhaust pipe.

2. Description of the Related Art

As disclosed in, for example, Japanese Patent Application Laid-open No. 6-2537, there is conventionally known an exhaust gas purification device for a vehicle engine, in which a catalytic converter is provided in an exhaust muffler of an engine, a downstream end of a secondary air introduction pipe is connected to an exhaust pipe upstream of the catalytic converter, and a dedicated air filter, which is independent from an intake air cleaner for the engine, is connected through a one-way valve to an upstream side of the secondary air introduction pipe, and the one-way valve is configured to be opened upon receipt of negative pressure in exhaust pulsation of the engine, thereby supplying secondary air filtered by the air filter to the exhaust pipe.

SUMMARY OF THE INVENTION

As described above, in the exhaust gas purification device for a vehicle engine, it is effective to provide the dedicated air filter for filtering the secondary air to be supplied to the exhaust pipe, in other words, to provide both the air cleaner for filtering intake air of the engine and the air filter for filtering the secondary air, in terms of avoiding mutual interference between intake pulsation and the exhaust pulsation of the engine to secure a certain performance of the engine.

Meanwhile, when such an exhaust gas purification device is employed in the general-purpose engine, it is required that a size of an outer shape of the engine is not increased as much as possible.

The present invention has been made in view of the above-described circumstances, and an object of the present invention is to provide an exhaust gas purification device for a general-purpose engine, which can be employed without increasing a size of an outer shape of the engine, and is also capable of securely introducing secondary air into an exhaust pipe and is thus capable of enhancing an exhaust gas purifying effect.

In order to achieve the object, according to a first aspect of the present invention, there is provided an exhaust gas purification device for a general-purpose engine comprising a crankcase and a cylinder block provided continuously on an upper portion of the crankcase and inclined to one lateral side of the crankcase, in which a catalytic converter is provided in an exhaust muffler of a general-purpose engine, a downstream end of a secondary air introduction pipe is connected to an exhaust pipe upstream of the exhaust muffler, a dedicated air filter independent from an intake air cleaner of the engine is connected through a one-way valve to an upstream side of the secondary air introduction pipe, and the one-way valve is configured to be opened upon receipt of negative pressure in exhaust pulsation of the engine, thereby supplying secondary air filtered by the air filter to the exhaust pipe, wherein the air filter is disposed between the crankcase and a lower surface of the cylinder block of the engine, and the secondary air introduction pipe is arranged so as to meander on one side of the cylinder block.

According to the first aspect of the present invention, the dedicated air filter for the secondary air is disposed between the crankcase and the lower surface of the cylinder block of the engine, and the secondary air introduction pipe is arranged in such a manner as to meander on the one side of the cylinder block. Accordingly, it is possible to prevent intake pulsation and the exhaust pulsation of the engine from interfering with each other, and to thus sufficiently exert the output performance of the engine by utilizing the intake pulsation of the engine and inertia effect thereof, and also to securely supply the secondary air to exhaust gas by utilizing the exhaust pulsation.

Moreover, a space between the crankcase and the lower surface of the cylinder block of the engine, which is originally a dead space, can be effectively utilized for installation of the air filter, making it possible to suppress increase in a size of an outer shape of the entire engine due to the installation.

Furthermore, a distance between the one-way valve, which is attached to the air filter disposed below the cylinder block, and the exhaust pipe, which is connected to the cylinder head, is relatively long, and the secondary air introduction pipe, which connects the one-way valve and the exhaust pipe, is arranged so as to meander along the one side of the cylinder block. Accordingly, it is possible to securely make an entire length of the secondary air introduction pipe sufficiently long, and to more securely supply the secondary air to the exhaust gas by effectively utilizing intake inertia of the secondary air due to the negative pressure. Thus, an exhaust gas detoxifying reaction can be performed more effectively in the catalytic converter. In addition, the arrangement of the secondary air introduction pipe on the one side of the cylinder block also contributes to the suppression of increase in the size of the outer shape of the entire engine.

According to a second aspect of the present invention, in addition to the first aspect, a temperature sensor for detecting that an ambient temperature becomes a predetermined value or higher and thereby stopping operation of the engine is provided to or near the one-way valve.

According to the second aspect of the present invention, the temperature sensor for detecting that the ambient temperature becomes a predetermined value or higher and thereby stopping the operation of the engine is provided to or near the one-way valve. Accordingly, if because of breakdown of the one-way valve, the exhaust gas flows into the one-way valve so that the one-way valve is overheated to a predetermined temperature or higher, the temperature sensor is activated to stop the operation of the engine. Accordingly, it is possible to prevent breakdown of peripheral devices due to the overheating.

According to a third aspect of the present invention, in addition to the first or second aspect, a drain port for discharging water droplets, which result from condensation on and flow down the secondary air introduction pipe, to an outside is openably and closably provided in the one-way valve.

According to the third aspect of the present invention, the drain port for discharging the water droplets, which result from the condensation on and flow down the secondary air introduction pipe, to the outside is openably and closably provided in the one-way valve. Accordingly, if the condensation occurs on an inner wall of the secondary air introduction pipe and water droplets produced by the condensation flow down to and are pooled in the one-way valve, it is possible to discharge the water droplets by opening the drain port.

The above and other objects, characteristics and advantages of the present invention will be clear from detailed descriptions of the preferred embodiment which will be provided below while referring to the attached drawings.

BRIEF DESCRIPTION OF THE DRAWINGS

FIG. 2 is a view as viewed in a direction of an arrow 2 in FIG. 1.

DESCRIPTION OF THE PREFERRED EMBODIMENT

Figure 1:
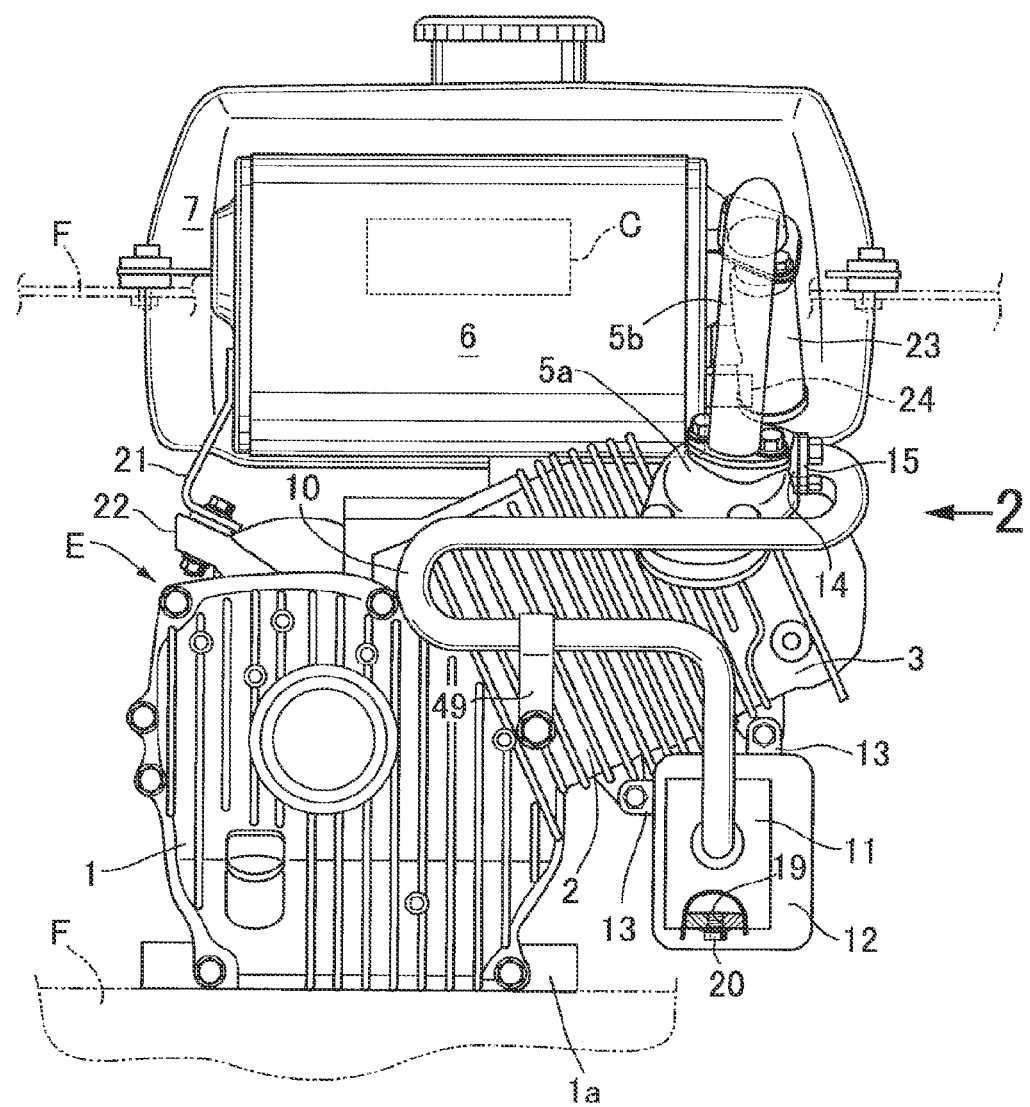
FIG. 1 is a side view of a general-purpose engine according to an embodiment of the present invention.

An embodiment of the present invention will be described below on the basis of the attached drawings.

First, in FIGS. 1 and 2, a general-purpose engine E for driving generators and other various work machines includes: a crankcase 1 having an installation flange 1a on a lower end thereof; a cylinder block 2 provided continuously on an upper portion of the crankcase 1 and inclined to one lateral side of the crankcase 1; and a cylinder head 3 provided continuously on an upper end of the cylinder block 2. A carburetor 4 is attached to one side surface of the cylinder head 3 where an intake port is open. An air cleaner 8 for filtering intake air of the engine E is connected to an air inlet of the carburetor 4. The installation flange 1a is attached onto a work machine's frame F supporting the engine E.

In addition, an exhaust gas inlet pipe 23 of an exhaust muffler 6 is connected through series-connected first and second exhaust pipes 5a, 5b to another side surface of the cylinder head 3 where an exhaust port is open. The exhaust muffler 6 is disposed immediately above the cylinder head 3 and the cylinder block 2. A stay 21 is provided on an end portion of the exhaust muffler 6 on an opposite side from the first exhaust pipe 5a. The stay 21 is supported on a bracket 22 projecting from the crankcase 1. A catalytic converter C for purifying exhaust gas passing through the exhaust muffler 6 is provided in the exhaust muffler 6. In FIG. 2, reference numeral 24 denotes an exhaust gas outlet pipe, which is open on an end surface of the exhaust muffler 6 on a side where the exhaust gas inlet pipe 23 is provided.

Moreover, a fuel tank 7 supported on the work machine's frame F is arranged on one lateral side of the exhaust muffler 6 and immediately above the air cleaner 8.

A downstream end of a secondary air introduction pipe 10 is connected to the first exhaust pipe 5a, and a dedicated air filter 12 is connected through a one-way valve 11 to an upstream end of the secondary air introduction pipe 10. An intermediate portion of the secondary air introduction pipe 10 is supported by a pipe holder 49 attached to the cylinder block 2.

The air filter 12 is fixed by fastening a pair of brackets 13, 13 of the air filter 12 to the cylinder block 2 and the cylinder head 3 with bolts, and is arranged in a space between the crankcase 1 and a lower surface of the cylinder block 2 of the engine E. The air filter 12 is configured such that an air inlet 12a of the air filter 12 is oriented in the same direction as the exhaust gas outlet pipe 24 of the exhaust muffler 6.

The one-way valve 11 is configured with a reed valve that responds sensitively to exhaust pulsation. The one-way valve 11 is configured to be closed upon receipt of positive pressure in the exhaust pulsation of the engine E and to be opened upon receipt of negative pressure thereof. The one-way valve 11 is attached to one side wall of the air filter 12.

A connection flange 14, which has a secondary air inlet 14a communicating with an inside of the first exhaust pipe 5a, is connected integrally to an intermediate portion of the first exhaust pipe 5a. The secondary air introduction pipe 10 is made of copper. A connection flange 15 on a downstream end of the secondary air introduction pipe 10 is bolted to the connection flange 14, and the secondary air introduction pipe 10 is arranged so as to meander along one side surfaces of the cylinder head 3 and the cylinder block 2. This allows a pipe length of the secondary air introduction pipe 10 to be set as long as possible. An upstream end of the secondary air introduction pipe 10 is connected to an outlet pipe 16 of the one-way valve 11 via a rubber tube 17. Using the rubber tube 17 as a joint in this way makes it possible to easily connect the secondary air introduction pipe 10 to the one-way valve 11.

A temperature sensor 18 for detecting that an ambient temperature becomes a predetermined value or higher and thereby stopping operation of the engine E is provided to or near the one-way valve 11. In addition, a drain port 19 for discharging water droplets, which result from condensation on and flow down an inner wall of the secondary air introduction pipe 10, to an outside is provided to the one-way valve 11. The drain port 19 is normally closed by a drain bolt 20. In addition, each portion of the meandering secondary air introduction pipe 10 is arranged laterally or with downward inclination so that water droplets condensed on the inner wall do not stagnate.

Next, an operation of the embodiment will be described.

During the operation of the engine E, while exhaust gas discharged from a combustion chamber of the engine E into the first and second exhaust pipes 5a, 5b is passing through the exhaust muffler 6, noise is eliminated, as well as HC and CO are detoxified by oxidation reaction and $NO_X$ is detoxified by reduction reaction. To promote these reactions for detoxifying substances, the secondary air is supplied into the exhaust gas by using the exhaust pulsation of the engine E as follows.

When the positive pressure in the exhaust pulsation, which is generated in the first exhaust pipe 5a during an exhaust stroke of the engine E, is transmitted to the one-way valve 11 through the secondary air introduction pipe 10, the one-way valve 11 is closed to prevent the positive pressure from being transmitted to the air filter 12 side. Next, when the negative pressure in the exhaust pulsation is transmitted to the one-way valve 11 through the secondary air introduction pipe 10, the one-way valve 11 is opened to transmit the negative pressure to the air filter 12. As a result, atmospheric air is drawn into and filtered by the air filter 12, and sucked into the first exhaust pipe 5a through the one-way valve 11 and the secondary air introduction pipe 10. The sucked air is then supplied through the first and second exhaust pipes 5a, 5b to the exhaust muffler 6, in which the air is mixed well with the exhaust gas, and then is supplied to the catalytic converter C. In this way, the reactions for detoxifying substances can be promoted effectively.

Meanwhile, the secondary air to be mixed with the exhaust gas is filtered by the dedicated air filter 12, which is independent from the air cleaner 8 of the engine E. This makes it possible to prevent the intake pulsation and the exhaust pulsation of the engine E from interfering with each other, and to thus sufficiently exert the output performance of the engine E by utilizing the intake pulsation of the engine E and inertia effect thereof, and also to securely supply the secondary air to the exhaust gas by utilizing the exhaust pulsation.

Moreover, since the air filter 12 is disposed between the crankcase 1 and the lower surface of the cylinder block 2 of the engine E, a space between the crankcase 1 and the lower surface of the cylinder block 2 of the engine E, which is originally a dead space, can be effectively utilized for installation of the air filter 12, making it possible to suppress increase in a size of an outer shape of the entire engine E due to the installation.

Furthermore, a distance between the one-way valve 11, which is attached to the air filter 12 disposed below the cylinder block 2, and the first exhaust pipe 5a, which is connected to the cylinder head 3, is relatively long, and the secondary air introduction pipe 10, which connects the one-way valve 11 and the first exhaust pipe 5a, is arranged so as to meander along one side of the cylinder block 2. Accordingly, it is possible to securely make an entire length of the secondary air introduction pipe 10 sufficiently long, and to securely supply the secondary air to the exhaust gas by effectively utilizing intake inertia of the secondary air due to the negative pressure. Thus, the reactions for detoxifying substances can be performed more effectively in the catalytic converter C. In addition, the arrangement of the secondary air introduction pipe 10 on the one side of the cylinder block 2 also contributes to the suppression of increase in the size of the outer shape of the entire engine E.

Even if the one-way valve 11 is broken down to be left open, leading to a situation where the exhaust gas flows into the air filter 12 side through the secondary air introduction pipe 10 and is discharged to atmosphere through the air inlet 12a of the air filter 12, the air inlet 12a is oriented in the same direction as the exhaust gas outlet of the exhaust gas outlet pipe 24 of the exhaust muffler 6 and no obstacles are generally placed so as to face the exhaust outlet of the exhaust muffler 6. Accordingly, the exhaust gas discharged from the air inlet 12a never comes into contact with any obstacles.

Moreover, if the one-way valve 11 is overheated to a predetermined temperature or higher due to inflow of the exhaust gas to the one-way valve 11 side, the temperature sensor 18 provided to or near the one-way valve 11 is activated to stop the operation of the engine E. Accordingly, it is possible to prevent breakdown of peripheral devices due to the overheating.

After the operation of the engine E is stopped, if the condensation occurs on the inner wall of the secondary air introduction pipe 10 and water droplets produced by the condensation flow down to and are pooled in the one-way valve 11, it is possible to discharge the water droplets from the drain port 19 to the outside by opening the drain port 19.

Note that the present invention is not limited to the above-described embodiment, and various changes in design can be made without departing from the gist of the present invention. For example, a downstream end portion of the secondary air introduction pipe 10 may be connected to the second exhaust pipe 5b on a downstream side of the first exhaust pipe 5a; however in order to mix the secondary air with the exhaust gas well, it is more effective to connect the downstream end portion of the secondary air introduction pipe 10 to the first exhaust pipe 5a. Moreover, the first and second exhaust pipes 5a, 5b may be formed integrally by casting or the like.

What is claimed is:

1. A combination of an exhaust gas purification device and a general-purpose engine, comprising:
    the general-purpose engine, which comprises a crankcase and a cylinder block provided continuously on an upper portion of the crankcase and inclined to one lateral side of the crankcase,
    an exhaust muffler having a catalytic converter provided therein,
    an exhaust pipe upstream of the exhaust muffler,
    a secondary air introduction pipe having a downstream end thereof being connected to the exhaust pipe,
    a dedicated air filter independent from an intake air cleaner of the engine,
    a one-way valve disposed on an upstream side of the secondary air introduction pipe, the dedicated air filter being connected to the secondary air introduction pipe through the one-way valve,
    wherein the one-way valve is configured to be opened upon receipt of negative pressure in exhaust pulsation of the engine, thereby supplying secondary air filtered by the air filter to the exhaust pipe,
    wherein the air filter is disposed in a space sideward of the crankcase and below the cylinder block of the engine, and
    wherein the secondary air introduction pipe is arranged so as to meander on one side of the cylinder block.

2. The combination according to claim 1, wherein a temperature sensor for detecting an ambient temperature is provided to or near the one-way valve.

3. The combination according to claim 1, wherein
    a drain port for discharging water droplets, which result from condensation on and flow down the secondary air introduction pipe, to an outside is openably and closably provided in the one-way valve.

4. The combination according to claim 2, wherein
    a drain port for discharging water droplets, which result from condensation on and flow down the secondary air introduction pipe, to an outside is openably and closably provided in the one-way valve.

5. The combination of the exhaust gas purification device and the general-purpose engine according to claim 1, wherein the secondary air introduction pipe is arranged to extend with downward inclination from its downstream end connected to the exhaust pipe to an upstream side of the secondary air introduction pipe connected to the air filter.

6. The combination of the exhaust gas purification device and the general-purpose engine according to claim 5, wherein the one-way valve is attached to one side wall of the air filter and a drain port for discharging water droplets is provided in the one-way valve.

* * * * *